United States Patent

Koukal et al.

[11] Patent Number: 4,838,110
[45] Date of Patent: Jun. 13, 1989

[54] CONNECTING DEVICE FOR CONNECTING BOWDEN CABLE CONTROL ELEMENTS, AND THE LIKE

[75] Inventors: Heinz Koukal; Klaus Arold, both of Sindelfingen, Fed. Rep. of Germany

[73] Assignee: Daimler-Benz Aktiengesellschaft, Stuttgart, Fed. Rep. of Germany

[21] Appl. No.: 156,025

[22] Filed: Feb. 16, 1988

[30] Foreign Application Priority Data

Feb. 14, 1987 [DE] Fed. Rep. of Germany ....... 3704640

[51] Int. Cl.⁴ ................................................ F16C 1/10
[52] U.S. Cl. ...................................... 74/502.6; 403/353
[58] Field of Search .............. 74/501 R, 501 A, 501.5, 74/502; 403/43, 353, 300

[56] References Cited

U.S. PATENT DOCUMENTS

| | | | |
|---|---|---|---|
| 3,424,027 | 1/1969 | Tschanz et al. ...................... | 74/502 |
| 3,542,408 | 11/1970 | Lowrey ................................ | 403/353 |
| 4,163,618 | 8/1979 | Giovannetti ..................... | 403/353 X |
| 4,323,273 | 4/1982 | Sword ............................. | 403/353 X |
| 4,452,097 | 6/1984 | Sünkel ............................... | 74/501 R |
| 4,678,360 | 7/1987 | Miller .................................. | 403/353 |

FOREIGN PATENT DOCUMENTS 2405321 8/1975 Fed. Rep. of Germany .... 74/501 R

*Primary Examiner*—Peter A. Aschenbrenner
*Attorney, Agent, or Firm*—Barnes & Thornburg

[57] ABSTRACT

A coupling device for rods required to be connected together is proposed, with a connecting element having bores on both sides, into which the ends of the rods can be inserted. One bore ends in an internal ring-shaped groove coaxial to it, in which an angled end of the rod is accommodated. The other bore is constructed as a screw-threaded bore, into which the rod is engageable by a screw-threaded shoulder. In order to insert the angled end, the connecting element is provided on its housing part with a releasable cover part, which can be closed and caught afterwards. A precise length adjustment of the rods is possible by rotating the connecting element.

21 Claims, 1 Drawing Sheet

4,838,110

CONNECTING DEVICE FOR CONNECTING BOWDEN CABLE CONTROL ELEMENTS, AND THE LIKE

BACKGROUND AND SUMMARY OF THE INVENTION

The invention relates to a coupling or connection device for control elements, particularly rods, Bowden cables, or the like which are required to be mutually connected.

A coupling device of this type is intended primarily for motor vehicles, in order to adjustably connect Bowden cables, rods or similar control elements which are provided to actuate the flaps of a heating apparatus. As a general rule it is difficult to assemble the control elements due to constricted space conditions. It is particularly a problem to adjust the flaps with the required precision, whilst the fresh air flaps to be actuated, which are required to close absolutely fluid-tightly in one position, frequently cannot be adjusted sufficiently accurately, compare German Published Unexamined Patent Application (DE-OS) No. 24 05 321.

A coupling device of the type initially mentioned is described in German Patent Application No. 47a 3-G 82, which is suitable for connecting two rods, each of which exhibits an angled end. The connecting element in this case is tripartite. It exhibits for each angled rod end a bored nipple, the bore of which merges at one end into a radial slot which serves to accommodate the angled end. Each nipple is provided with a male screw-thread, by which it is engageable into an associated sleeve provided with a female screw-thread on both sides, after the insertion of the angled ends of the rods. This coupling device serves for the permanently firm coaxial connection of rods, although no adjustability of the length of the rods so connected would be possible here. In the one axial direction the angled rod ends strike the radial slot of the respective nipple. In the opposite axial direction, that is to say in the slide-in direction of the rods into the coupling device, the rods strike with the angled end axially against an internal web of the sleeve which subdivides the screw-threaded bore of the sleeve into two bore sections. If a length adjustment were to be attempted by loosening the nipple, then this leads to axial play of the rod between the web of the sleeve on the one hand and the radial slot of the nipple on the other hand. For these reasons the known coupling device is unsuitable for the length adjustment of the two rods connectable in this manner.

An underlying object of the invention is to develop a coupling device of the generic type referred to above, which, whilst having a particularly simple construction, permits a precise length adjustment of the control elements to be mutually connected by it.

This object is achieved according to the invention, by providing a threaded connection at one end of the connecting element and by providing an anchoring ring groove in a bore at the other end of the connecting element, the ring groove serving to anchor a first control element with relative rotation of the first control element and the connecting element being permitted to accommodate threaded adjustment of the connection at a second control element.

The coupling device according to the invention possesses the following advantages. It is particularly simple, economical of space and inexpensive. It permits a precise adjustment of the length of the control elements connected to it, and thus, in a simple manner a highly precise adjustment of flaps or similar parts which have to be actuated by means of the control elements. A subsequent adjustment and readjustment is also possible. Another advantage is the possibility of a direct articulation of the flaps without intermediate lever, auxiliary lever, and the like. The adjusting movement is effected in simple manner by rotating the connecting element relative to the control elements.

An advantageous further development results with especially preferred embodiments which have a housing cover part. Here the cover part may be a separate, removable and reattachable part of the connecting element, whilst the cover part permits the engagement of a control element into the bore and adjoining ring-shaped groove, the coupling part of which exhibits the angled end. A connecting element formed in this way, as a plastic part, for example, is particularly simple, light, economical of space and inexpensive.

Especially preferred embodiments include simple snap connection devices for the housing cover part. Also, the bores and grooves for accommodating connection of the connecting element to the control elements are dimensioned to permit the insertion of the angled bent end in a simple manner.

Other objects, advantages and novel features of the present invention will become apparent from the following detailed description of the invention when considered in conjunction with the accompanying drawings.

DETAILED DESCRIPTION OF THE DRAWINGS

Figure 1:
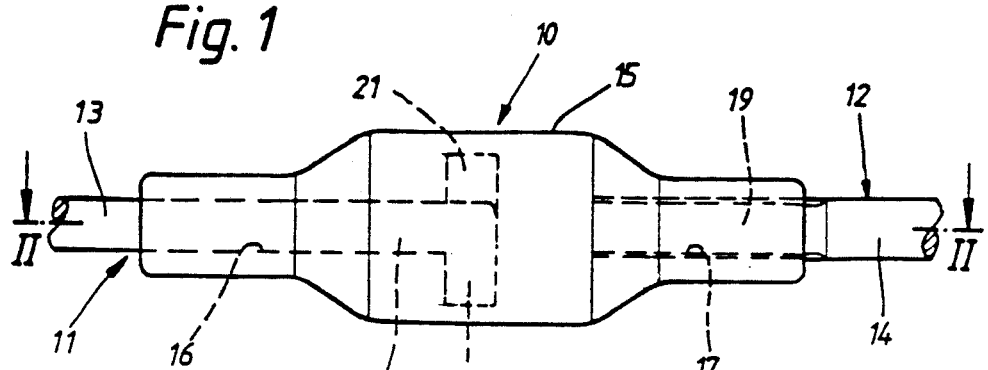
FIG. 1 is a diagrammatic side elevation view of a connecting device with two control elements connected thereby constructed in accordance with a preferred embodiment of the invention.

The coupling device 10 illustrated in FIGS. 1 to 4 is intended for the mutual adjustable connection of two control elements 11 and 12. The two control elements 11 and 12 respectively consist here of rods 13 and 14, which are aligned somewhat mutually coaxially and lead, for example, to flaps, not further shown, of a heating apparatus in a motor vehicle, which are required to be either opened and closed in the same direction or actuated oppositely by means of the control elements 11, 12.

The coupling device 10 exhibits a connecting element 15 which preferably consists of a plastics molding. The connecting element 15 contains at each end a bore 16 and 17, in each of which a coupling part 18 or 19 provided at the end of each control element 11, 12 is receivable and anchorable. The bore 17 is constructed as a screw-threaded bore. The associated coupling part 19 exhibits a screw-threaded section engageable adjustably in this screw-threaded bore, which is an integral part of the control element 12 in the form of the rod 14.

The other coupling part 18 is likewise an integral constituent of the control element 11 constructed as a rod 13. It exhibits a cylindrical section with a rectilinear end section 20 angled somewhat at right angles. In order to receive the angled end 20, the bore 16 which serves to receive this coupling part 18 merges internally into a somewhat radially jutting accommodating space, which is constructed here as a ring-shaped groove 21 coaxial to the bore 16. The coupling part 18 which is insertable into this end—on the left in FIGS. 1 and 2—of the connecting element 15 is therefore rotatably receivable by its cylindrical section within the bore 16 and by the angled end 20 within the ring-shaped groove 21. The relative axial position between the connecting element 15 on the one hand and this control element 11, constructed as a rod 13, on the other hand, is thereby firmly predetermined, namely in both axial directions. Due to the relative rotatability of the connecting element 15, by rotating the connection element, the screw-threaded section of the other control element 12, constructed as a rod 14, can be screwed more or less deeply into the screw-threaded bore 17, whereby an extremely precise adjustment of the two control elements 11, 12 mutually connected by the coupling device 10, and hence of the flaps actuated by them, is possible in a simple manner. Even subsequent to manufacture, a movement and fresh adjustment of the control elements 11 and 12, and hence of the flaps actuated by them, is possible. The flaps may then be articulated directly without the necessity for intermediate levers, auxiliary levers, or the like. By a rotary movement of the connecting element 15, a sensitive adjustment of the length, and simultaneously also a compensation of tolerances or similar inaccuracies is possible.

The connecting element 15 exhibits an integral housing part 22 and also a cover part 23. The axial length of the cover part 23 is chosen so that it extends axially along the ring-shaped groove 21 and from there at least along a part of the bore 16. In the folded-up, closed state of the cover part 23, the latter masks the ring-shaped groove 21 and a portion of the bore 16 radially in this axial region. The cover part 23 is constructed as a somewhat diametrical half of the housing part 22, for example, or instead smaller than such a diametral half.

Figure 2:
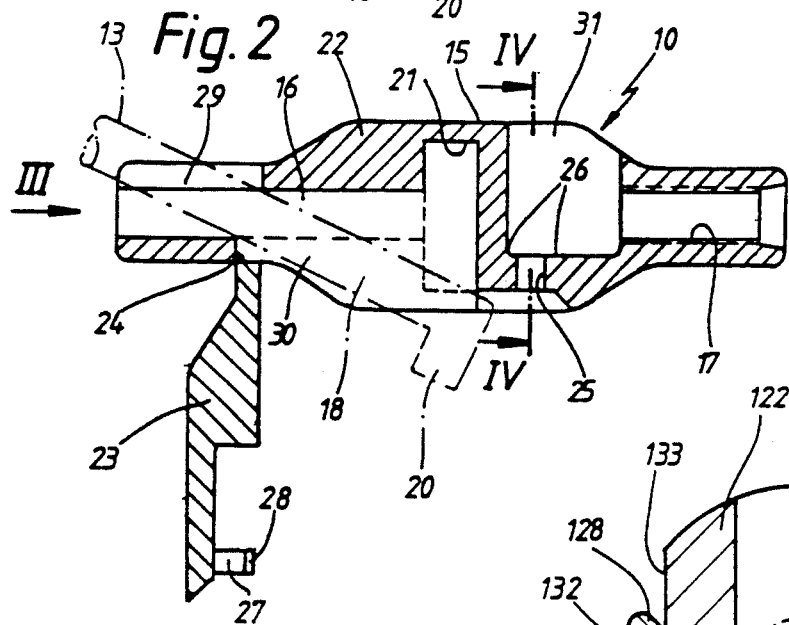
FIG. 2 is a diagrammatic sectional view taken along the Line II—II in FIG. 2, but before the connection of the two control elements.

As may be seen from FIG. 2, the cover part 23 is retained by one terminal region with pivotable mobility on the housing part 22 by means of a film hinge, indicated only diagrammatically as a joint 24. The joint 24 is present at an axial spacing from the ring-shaped groove 21. A frictional and/or positive detachable connection, which is constructed as a clip connection, for example, is provided between the housing part 22 and the cover part 23 at a spacing from the joint 24. The housing part 22 contains at least one somewhat radial plug-in aperture 25, the upper inner end of which (in FIG. 2) is adjoined by axial catch surfaces 26. The cover part 23 is provided with, for example, two preferably resilient integrally shaped locking tongues 27 which engage through the plug-in aperture 25 and engage positively and catch over the catch surfaces 26 by terminal hooks 28.

In order that the control element 11 constructed as a rod 13 can be inserted into the bore 16 and ring-shaped groove 21, namely in the manner indicated by chain-dotted lines in FIG. 2, the bore 16 is opened, starting from the end of the connecting element 15, on an axial section of adequate length radially and upwards in FIG. 2 by means of a longitudinal slot 29, and in the direction remote from the cover part 23. On the diametrically opposite side, pointing downwards in FIG. 2, that part of the bore 16 which approximately adjoins axially the longitudinal slot 29, and the ring-shaped groove 21 are opened radially by means of a longitudinal slot 30, in the direction which points towards the cover part 23.

Figure 4:
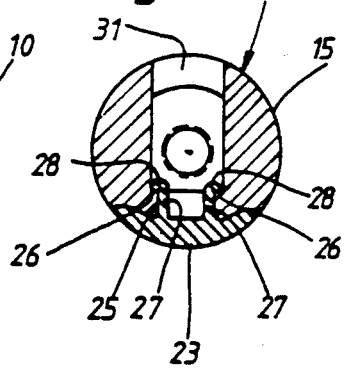
FIG. 4 is a diagrammatic sectional view taken along the Line IV—IV in FIG. 2.

If it is required to attach the control element 11 constructed as a rod 13 by its terminal coupling part 18 to the connecting element 15, then the cover part 23 is pivoted into the open position shown in FIG. 2 and the rod 13 is introduced in the position shown by chain-dotted lines into the bore 16 and the ring-shaped groove 21. The rod 13 is then aligned coaxially to the bore 16, whilst the angled end 20 engages into the ring-shaped groove 21 and is thus connected to the connecting element 15 in the axial direction, although a relative rotatability between the two parts is possible. After this the cover part 23 is folded up to the housing part 22, whilst the locking tongues 27 engage through the plug-in aperture 25 and engage lockingly by the hooks 28 over the catch surfaces 26, as FIG. 4 shows. In this position the cover part 23 is connected positively and firmly to the housing part 22 and makes it impossible for the rod 13 to be remove or moved axially from the connecting element 15. In order to release it, the hooks 28 can be reached with a tool from the exterior through an aperture 31 in the housing part 22 and moved inwards, so that the hooks 28 release the catch surfaces 26 and the cover part 23 can be folded away back into the position shown in FIG. 2.

In another preferred embodiment, not shown, the cover part 23 is toaally detachable from the housing part 22 and attachable frictionally and/or positively thereto, by means of snap connections, for example.

Figure 5:
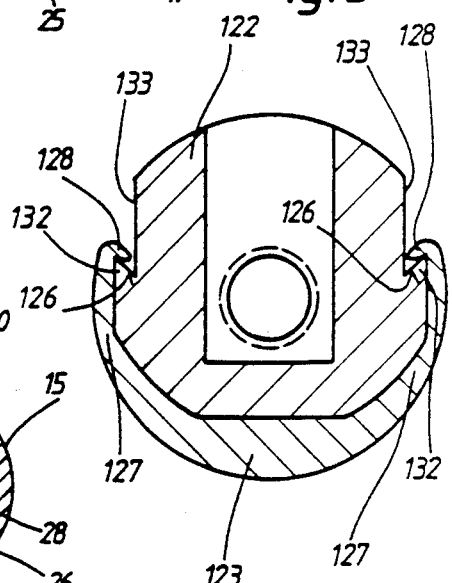
FIG. 5 is a diagrammatic section corresponding somewhat to that in FIG. 4, showing another preferred exemplary embodiment on a larger scale.
Figure 3:
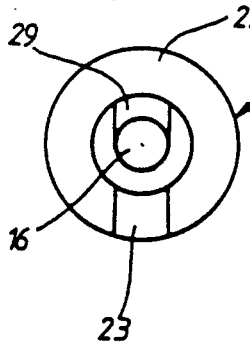
FIG. 3 is a diagrammatic side elevation view taken in the direction the arrow III in FIG. 2.

In the case of the second preferred embodiment illustrated in FIG. 5, reference numerals increased by 100 are used for those parts which correspond to the first exemplary embodiment, so that reference is thereby made to the description of the first exemplary embodiment whilst avoiding repetitions.

The second exemplary embodiment differs from the first one as regards the releasable frictional and/or positive catching of the cover part 123 to housing part 122. The housing part 122 exhibits at least two external catch surfaces 126 located mutually diametrically opposite on the housing circumference with upstanding hooks 132, for example, which are located on the end of flattened lateral surfaces 133. The cover part 123 exhibits two preferably resilient locking tongues 127 engaging externally over the housing part 122, which carry terminal hooks 128 which engage over the hooks 132 and in this manner permit a positive releasable closed position of the cover part 123.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A connecting device for connecting together and fixedly adjusting the axial distance between a pair of axially aligned control elements, such as rods, Bowden cables or the like, comprising:

a connecting element having first bore means at a first axial end thereof for receiving an end of a first control element to be connected thereat;

said first bore means having a first section extending from the first axial end of the connecting element and an adjoining second section of a larger cross-section than the first section to form an accommodating space for anchoring an angled end of a first control element;

said connecting element including screw thread means for threadably attaching the connecting element to a threaded end of a second control element; and wherein said accommodating space is constructed as a ring-shaped groove which permits relative rotation of the connecting element and the first control element without relative axial movement therebetween and whereby the connecting element can be rotated for precisely adjusting the axial distance between the first and second control element connected thereto without rotating said control element.

2. A connecting device according to claim 1, wherein said screw thread means are internal threads on a second bore means in the connecting element.

3. A connecting device according to claim 1, wherein the connecting element exhibits an integral housing part and a cover part extending along the course of the first bore means which radially masks portions of the first bore means.

4. A connecting device according to claim 3, wherein the cover part extends axially along the ring-shaped groove and from there at least along a part of the first section of the first bore means.

5. A connecting device according to claim 4, wherein the cover part is constructed as a partial circumferential segment of the housing part.

6. A connecting device according to claim 5, wherein the cover part is constructed as a diametrical half circumferential segment of the housing part.

7. A connecting device according to claim 5, wherein the cover part is detachably attachable to the housing part by at least one of a frictional and positive clamping means.

8. A connecting device according to claim 7, wherein the clamping means includes a clip connection between the housing part and the cover part.

9. A connecting device according to claim 5, wherein the cover part is retained on the housing part with pivotal mobility at a spacing from the ring-shaped groove, and wherein the at least one frictional and positive detachable connection is provided at a spacing from the pivotal axis.

10. A connecting device according to claim 1, wherein the connecting element is made of plastic.

11. A connecting device according to claim 9, wherein a film hinge retains the cover part on the housing part with pivotal mobility.

12. A connecting device according to claim 7, wherein the housing part exhibits at least one somewhat radial plug-in aperture and the cover part exhibits resilient locking tongues engaging through the plug-in aperture and engaging lockingly over axial catch surfaces of the latter.

13. A connecting device according to claim 7, wherein the housing part exhibits at least two external catch surfaces, upstanding hooks, located somewhat diametrically opposite on the housing circumference, and wherein the cover part exhibits two resilient locking tongues engaging externally over the housing part, which can engage lockingly over the catch surfaces of the housing part by terminal locking surfaces hook.

14. A connecting device according to claim 3, wherein the first section of the first bore means which merges into the ring-shaped groove is opened radially in the direction remote from the cover part on an axial section starting from the end of the connecting element.

15. A connecting device according to claim 14, wherein the first section of the first bore means which merges into the ring-shaped groove together with the ring-shaped groove on the other axial section, which extends axially somewhat from the longitudinal slot to the end of the ring-shaped groove, is opened radially and in the direction which points towards the cover part by means of a longitudinal slot.

16. A connecting device according to claim 1, further comprising a first control element with an angled end, said first control element being an integral part of a rod control arrangement.

17. A connecting device according to claim 3, further comprising a second rod control element having a screw thread for engaging the screw thread means of the connecting element.

18. A connecting device according to claim 16, further comprising a second rod control element having a screw thread for engaging the screw thread means of the connecting element.

19. A connecting device according to claim 12, further comprising a tool access bore opening into the connecting element to accommodate a tool means for releasing the locking tongues.

20. A connecting device according to claim 19, wherein said screw thread means are internal threads on a second bore means in the connecting element and wherein said tool access bore opens into said second bore means.

21. A connecting device according to claim 18, wherein said control elements are connected in a vehicle to vehicle air conditioning and heating flaps.

* * * * *